(12) United States Patent  (10) Patent No.: US 7,756,823 B2
Young et al.  (45) Date of Patent: Jul. 13, 2010

(54) DYNAMIC REFERENCE REPOSITORY

(75) Inventors: Kendall G. Young, Crowley, TX (US); Chris A. Frangos, Southlake, TX (US); Todd A. Williams, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1005 days.

(21) Appl. No.: 10/824,449

(22) Filed: Apr. 14, 2004

(65) Prior Publication Data

US 2005/0216489 A1 Sep. 29, 2005

Related U.S. Application Data

(60) Provisional application No. 60/556,613, filed on Mar. 26, 2004.

(51) Int. Cl.
 *G06F 17/00* (2006.01)
(52) U.S. Cl. .............................. 707/603; 706/61; 705/7
(58) Field of Classification Search .................... 707/3, 707/102; 706/45, 50
See application file for complete search history.

(56) References Cited

U.S. PATENT DOCUMENTS

| | | | | |
|---|---|---|---|---|
| 6,070,143 | A * | 5/2000 | Barney et al. .................. 705/8 |
| 6,161,102 | A * | 12/2000 | Yanagihara et al. ............ 707/3 |
| 6,363,377 | B1 * | 3/2002 | Kravets et al. ................. 707/4 |
| 6,654,751 | B1 * | 11/2003 | Schmugar et al. ............. 707/10 |
| 7,017,183 | B1 * | 3/2006 | Frey et al. ...................... 726/5 |
| 7,028,038 | B1 * | 4/2006 | Pakhomov .................. 707/100 |
| 7,200,592 | B2 * | 4/2007 | Goodwin et al. ............... 707/6 |
| 7,209,906 | B2 * | 4/2007 | Goodwin et al. ............. 706/14 |
| 7,308,414 | B2 * | 12/2007 | Parker et al. ................... 705/7 |
| 7,346,529 | B2 * | 3/2008 | Flores ........................... 705/7 |
| 2001/0047355 | A1 * | 11/2001 | Anwar ........................... 707/5 |
| 2002/0169737 | A1 * | 11/2002 | Armstrong et al. ........... 706/59 |
| 2003/0093310 | A1 * | 5/2003 | Macrae ......................... 705/8 |
| 2003/0130974 | A1 * | 7/2003 | Tafoya ........................ 706/50 |
| 2005/0015382 | A1 * | 1/2005 | Aaron ........................ 707/100 |

OTHER PUBLICATIONS

Pohs, Wendy, "A preview of Lotus Discovery Server 2.0". May 1, 2002. http://www.ibm.com/developerworks/lotus/library/ls-DSpreview/index.html.*
"How Scirus Works". A white paper on the Scirius scientific search engine. Published Feb. 2003.*
Roger D. Smith. "Chief Technology Officer (CTO) Roles and Responsibilities"Research Technology Management, Jul.-Aug. 2003.*

\* cited by examiner

*Primary Examiner*—John R. Cottingham
*Assistant Examiner*—Robert Timblin
(74) *Attorney, Agent, or Firm*—Bracewell & Giuliani LLP

(57) ABSTRACT

A method for maintaining a dynamic reference repository within an enterprise architecture domain, comprises discovering pertinent input(s) to the dynamic reference repository. These newly discovered pertinent inputs are then retrieved to the dynamic reference repository. After retrieval, the pertinent input(s) to the dynamic reference repository are managed and distributed within the enterprise architecture domain.

38 Claims, 5 Drawing Sheets

DYNAMIC REFERENCE REPOSITORY

CROSS-REFERENCE TO RELATED APPLICATION

This application claims the benefit of priority to U.S. Provisional Patent Application No. 60/556,613 entitled "Dynamic Reference Repository", filed on Mar. 26, 2004, and is incorporated herein by reference in its entirety.

TECHNICAL FIELD OF THE INVENTION

The present invention relates generally to the field of database management. More particularly, the present invention relates to methods and systems for dynamically populating and updating a database on a computer network. Even more particularly, the present invention relates to a method and system for a dynamic enterprise architecture reference repository.

BACKGROUND OF THE INVENTION

Dramatic growth in the amount of data that must be stored in a typical enterprise computer network, combined with the need for faster, more reliable and more efficient data access, and data management capabilities, and maintaining data consistency and currency have led many organizations to seek an improved way of storing, accessing, populating, and managing network data. In a traditional client-server computer network, a client computer requests information from a server computer. In response to the request, the server computer provides the requested information to the client computer. Individual users typically operate client computers, which are serviced by server computers. Server computers are typically operated by larger entities such as information providers, commercial organizations, government entities, and universities.

A client-server computer network can exist in the form of an intranet. An intranet is a client-server network configured for the private use of an enterprise and its authorized users. Within such a client-server computer network, and indeed within any client-server computer network, one or more servers can be configured to host one or more databases. Databases are well known in the art. A database is a specialized program for dedicated storage of large amounts of information. Typically databases are logical storage configurations that provide for flexible and efficient data storage and retrieval, as well as specialized functions for relating and cross-referencing data. A user of the client-server computer network can thus rapidly and easily access the data stored in a database. The data can be retrieved, used, modified and saved back to the database in an efficient manner and in a way that multiple network users can use and track changes to the data.

However, a problem with currently existing database systems and methods is consistency and currency of the stored data. Keeping stored data current is important to ensure that all database users have access to the most recent version of a particular data resource and to ensure that individual changes to the data are tracked and communicated to all users. This is especially true in enterprises that require intensive processing of large amounts of data by multiple users. Therefore, it is desirable to have a means to track changes to database information and to keep the information current and consistent for all users. For example, as a result of acquisition reform, government agencies and government contractors are now required to develop enterprise architectures for acquisitions programs that involve Information Technology (IT). Because IT is pervasive in the defense and commercial arenas, a need exists for tracking, cataloging and maintaining current the U.S. Government's voluminous and evolving acquisition requirements in operational procedures. With currently existing database systems, it is problematic to exhaustively discover, retrieve, catalog manage, maintain, share and distribute pertinent reference documents and Subject Matter Expert (SME) inputs that bear upon the data-intensive problem associated with enterprise architecture development.

Typically, prior art complex database systems are updated and maintained manually in a haphazard manner, either by a dedicated database technician or by individual users inputting updates to a knowledge database as they become aware of new information, such as through personal interactions, personal reading, meetings, or through some other information conduit. This haphazard means of updating a complex database is especially problematic when the information domain of interest is rapidly changing. Maintaining currency and consistency of the knowledge domain reference material is therefore an on-going challenge for current database management methods and systems.

Prior art database management systems and methods provide a poor solution to the data currency issue described above. Existing databases are thus only as current as the last inputs that were manually searched for and stored. This is because current database systems address the problem by using a large suite of disconnected software applications designed for management and distribution of various electronic artifacts. These applications typically require a great deal of "human-ware" to achieve the level of database sharing and collaboration that enterprises are now demanding.

Therefore, a need exists for a method and system for dynamically updating an enterprise architecture reference repository that can reduce or eliminate these problems and others associated with prior art database management systems and methods.

SUMMARY OF THE INVENTION

The present invention provides a method and system for maintaining a dynamic reference repository within an enterprise that substantially addresses the above-identified needs. This method first discovers pertinent inputs to the dynamic reference repository and retrieves those pertinent inputs. Then these pertinent inputs are managed and distributed to update the dynamic reference repository. Additional embodiment may catalogue the pertinent input and/or maintain these pertinent inputs to the dynamic reference repository.

A customizable agent (set of software instructions) searches to discover and retrieve these pertinent inputs from resources operably coupled to the dynamic reference repository. Examples of these resources include networks, such as the Internet, internal networks (intranets), and any other like coupled resources. Additionally, customizable agents may discover and retrieve pertinent inputs from SMEs. Utilities within the customizable agents operate to conduct SME reviews, assessments, or interviews. For example, the agent may initiate contact with a SME via email. This email may provide a link to website where the agents conduct SME reviews, assessments, or interviews with an interactive website. Additionally, inputs may be received as communications addressed directly to the dynamic reference repository. Examples of such inputs include emails, faxes, or other like forms of communication known to those skilled in the art.

The customizable agents may be created, edited and managed using an interface, such as a graphical user interface (GUI) or other like interface known to those skilled in the art. This interface operably couples to the dynamic reference repository and facilitates the user(s) creation, development, and management of the customizable agents and their searches. Searches may be run automatically or may be executed according to a specified periodicity with prioritized searches of specified or discovered reference materials.

The searches conducted by the customizable agents or communications received by the dynamic reference repository may be neutral to data type. This means that the agents are robust enough to identify and retrieve the pertinent inputs no matter what the data type. This ability requires that the agents be able to evolve as new data formats are introduced. Common data types include but are not limited to electronic forms such as those compatible with Microsoft Office, internet documents, email documents, or any other compatible forms of electronic communication. Thus these communications may include graphics, text, video or audio communications that the customizable agents are able to identify and retrieve pertinent inputs from. Additionally the customizable agents may recognize and filter the pertinent input based on context. Pertinent inputs when discovered and retrieved may be time stamped prior to dissemination within the dynamic reference repository.

Another embodiment provides a dynamic reference repository having a database or system of databases. Additionally, a resource containing raw information is operably coupled to the dynamic repository. A processing module within the dynamic reference repository executes a set of instructions. This set of instructions, which may take the form of a customizable agent, identifies and retrieves pertinent inputs to the dynamic reference repository located within resources available to the dynamic reference repository. Furthermore this set of instructions may manage and distribute the pertinent inputs to the dynamic reference repository and to users thereof. In certain cases the set of instructions may actually be modified based on the pertinent inputs. In additional embodiments the processing module executes instructions that catalogue and maintain the pertinent inputs. As in the previous embodiment, the resources may include the Internet, intranet, subject matter expert, or other like resources known to those skilled in the art.

The dynamic reference repository instantiation may further include a user interface that allows users to create, edit and manage the customizable agents. These customizable agents may further include utilities that extract the pertinent inputs from communications received by the dynamic reference repository, or to conduct SME reviews, assessments, or interviews. As before these customizable agents may be neutral to data type and may discover pertinent inputs by executing periodic prioritized searches of reference materials located within the resources coupled to the dynamic reference repository.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Figure 1:
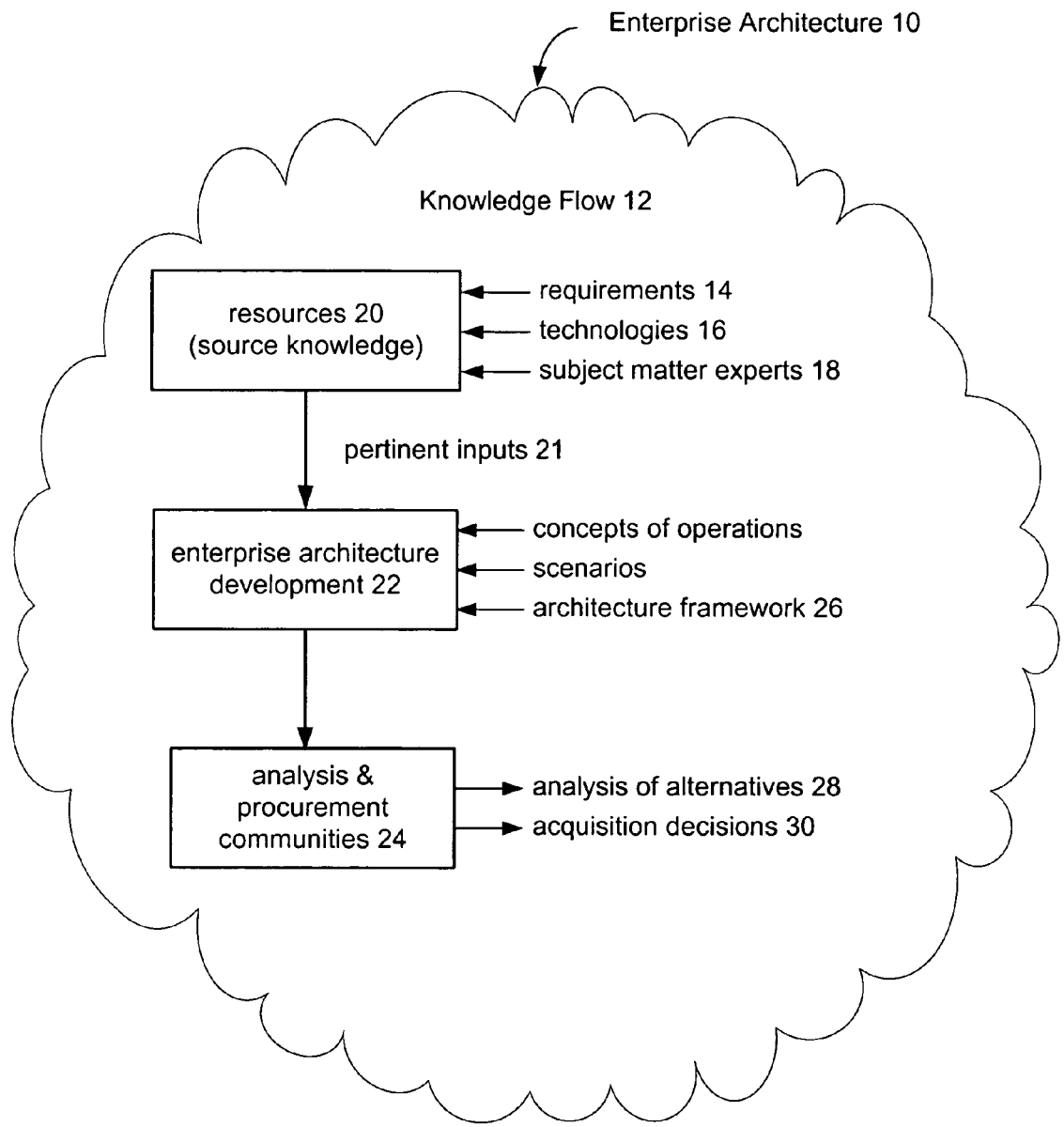
FIG. 1 illustrates knowledge flow within an enterprise architecture in accordance with the present invention.

Preferred embodiments of the present invention are illustrated in the FIGUREs, like numerals being used to refer to like and corresponding parts of the various drawings.

The present invention can provide a means of automated reference knowledge management in the domain of enterprise architecture. The embodiments of the present invention are intended to address the reference knowledge acquisition and management problems in support of enterprise architecture development that are lacking in the prior art.

Various embodiments provide a set of new software functionalities for discovering, retrieving, cataloging, managing, maintaining, sharing and distributing pertinent reference documents and Subject Matter Expert (SME) inputs to a database system. Discovery and retrieval of reference knowledge to and from a database can be provided through customizable agent searches/retrievals from the Internet, an intranet, or any other network based reference source, and through automated filtering and prioritizing. Embodiments of this invention can further comprise utilities for gathering SME reviews, assessments and interviews.

Users of a database incorporating an embodiment of the present invention will also be provided, in accordance with the teachings of this invention, the ability to address e-mail to the database, thus making e-mail assessments and collaboration an integral part of a database in accordance with an embodiment of the present invention. Further still, embodiments of this invention can comprise a graphical user interface (GUI) for developing, customizing and managing search agents, filters, and rankings and for otherwise interfacing with the database and its associated features. Proactive monitoring of emergent reference materials can be performed by custom-designed agent searches in the network domains. Based upon user design intent, the embodiments can provide periodic and prioritized reports and updates of desired reference materials. The embodiments can also provide utilities for managing desired reference materials, to include integrated assessments, associations, and peer notifications. Such utilities can comprise computer-executable software instructions operable to perform the desired functionality.

Embodiments further have the capability to be neutral to data type (format), allowing for the capture of reference material in many potential electronic and digital formats. A database incorporating an embodiment of the present invention can be organized around a user-customizable ontology and taxonomy of an enterprise architecture domain, enabling users to categorize and interrelate reference materials (data). The taxonomy will facilitate the mapping of enterprise requirements and pertinent technologies to a desired capability. Utilities for these capability mappings will allow users to evaluate the potential of numerous technical solutions to a given requirement.

Another embodiment provides an enterprise maintaining a database, or system of databases, the ability to maintain an integrated, shared and distributed knowledge base of current domain documents, artifacts, and SME expertise that pertains to the enterprise's area of interest. This collection of information (the database population) may take any number of electronic forms, including but not limited to typical office software productivity products, web documentation, e-mail documentation, and other like formats known to those skilled in the art. The embodiments of this invention can provide for integrated access to the knowledge database system through a single user interface, instead of through multiple disparate interfaces to multiple databases.

Through a shared and distributed knowledge base, an enterprise architecture database system can enable each user's research to be used by every other user, eliminating the need for redundant research activities by all users. Embodiments may include a database organized around a thorough ontology and taxonomy of the architecture domain. Such a database will further comprise utilities for analyzing and drawing logical linkages among the domain documents, assessments and SME inputs. Further still, embodiments provide for currency and consistency of the stored information by proactive monitoring of the domain. Utilities can be provided for SME assessments, peer user notifications, time stamping of reference and collaboration documents, and categorization and logical mapping of inputs to the database.

In the enterprise architecture domain, the amount and scope of references, solutions, etc. have reached a scale that becomes burdensome to track. In fact, sometimes it is not possible to track current advances with current solutions. As a result, a need exist for the capabilities provide by the present invention. These capabilities include automation of tracking, organizing and cataloging advances to and information sources for the enterprise architecture domain. This insures both currency and consistency of the information available to users and also insures that all users are accessing the same and current information.

Previous solutions dealt with this problem in a haphazard amalgamation of hearsay from individuals. The hearsay then prompted research into the existence of updates to a project or a database with a knowledge base from which the individuals were working. Then updates, if proven to in fact be updates and worthy of inclusion, were manually entered into the knowledge database. One advantage the present invention provides over previous solutions is that the agents may be automated to search at set interval, based on another algorithm, or when manually initiated. This search scours the various identified and unidentified sources of information within the raw data identified and available for updates. Automated software agents process and retrieve those updates and automatically enter them into the database with an optional time stamp prior to dissemination to the appropriate users of the database.

The present invention in fact provides a definition or a method of defining a common set of data, databases, and sources of information that can be accessed through an enterprise architecture. In other words, the present invention provides an intelligent database, a database that can update its sources of information automatically, provide those updates to all of the users in the enterprise architecture, and provide notice of those updates to the users of the enterprise architecture.

A common data depository within enterprise architecture is provided with the ability to be intelligently managed/organized based on the results of searches conducted by customizable search agents. The common depository may be an existing resource updated by or a new resource created with the results of the search.

The method and system of this invention provide a means by which common data repository in support of enterprise architecture can be maintained current in an automated fashion and further provides a means of informing users of that data depository of the currency and of any changes in the common data depository.

Since prior solutions updated the database in a haphazard manner, updates could be missed or that users may not be aware of the updates. Thus, users may not be using the same version of a document or other data resource. The situation is particularly relevant where government agencies, or similar entities, routinely issue updates to their procedure, manuals, or purchasing systems, etc. without a means to efficiently track the varied and numerous updates. Therefore an enterprise that deals extensively with such an entity would gain substantially from the present invention.

Additionally, the present invention can manage its searches in an intelligent manner such that a database can be populated and maintained current. Alternatively, the present invention can repopulate, update and even redefine contextually the terms and definitions underlying the database and the agents based on discovered or received inputs.

The agents can interpret similar or even identical terms or definitions contextually. For example, acronyms used within different resources must be interpreted differently to avoid returning non-pertinent inputs to a search. As an example, one resource might use a term such as TCS, which in one instance stands for Tactical Control Station while in another instance TCS stands for Time Critical Strike. The agents are able to tag a term, such as the above acronyms and contextually relate the term with its source. This allows the terms to be differentiated and properly used, thus maintaining the integrity of the assigned meaning. This avoids the time consuming processes that requires manually filtering searches or conducting multiple limited searches.

This invention need not be limited to use with government agencies. Rather this application has many potential commercial applications for any organization that seeks to track and maintain current large amounts of information.

Further the information obtained from the customizable agents may be format neutral. Format neutral is taken to mean that as standards evolve for example, data delivery standards such as going from a tape drive, to a floppy, to a CD, to a DVD, these different formats and data delivery standards may not be compatible with one another. However, the agents can integrate data from various sources and various different formats into a common standard used within the enterprise architecture system. Application of this invention accounts for all of these different formats and different systems to provide an end product accessible by a common interface. This feature may involve manual input in term of deciding what formats to support and which ones are being phasing out.

FIG. 1 provides a context in which to place the method and system of this invention. There has been a great variety and a great amount of work done in regard to the tools and processes of enterprise architecture development. This invention focuses on the management, deployment and currency (keeping data up to date) of information that comes into a database within the enterprise architecture 10. Additionally, the present invention gathers the information to achieve these functions. FIG. 1 illustrates knowledge flow 12 within enterprise architecture 10. Here knowledge flows from resources 20 and includes information from requirements 14, technologies 16 and subject matter experts (SMEs) 18. Resources 20 may be within the enterprise or accessible by or available to enterprise architecture 10. From resources 20 one may glean pertinent inputs 21 which transition to the enterprise architecture development 22. Pertinent inputs 21 from resources 20 help define the enterprise architecture development 22 and determine how that architecture may be deployed and utilized by analysis and procurement communities 24. Framework 26 of enterprise architecture 22 allows analysis of alternatives 28 and acquisition decisions 30 to be determined.

Figure 2:
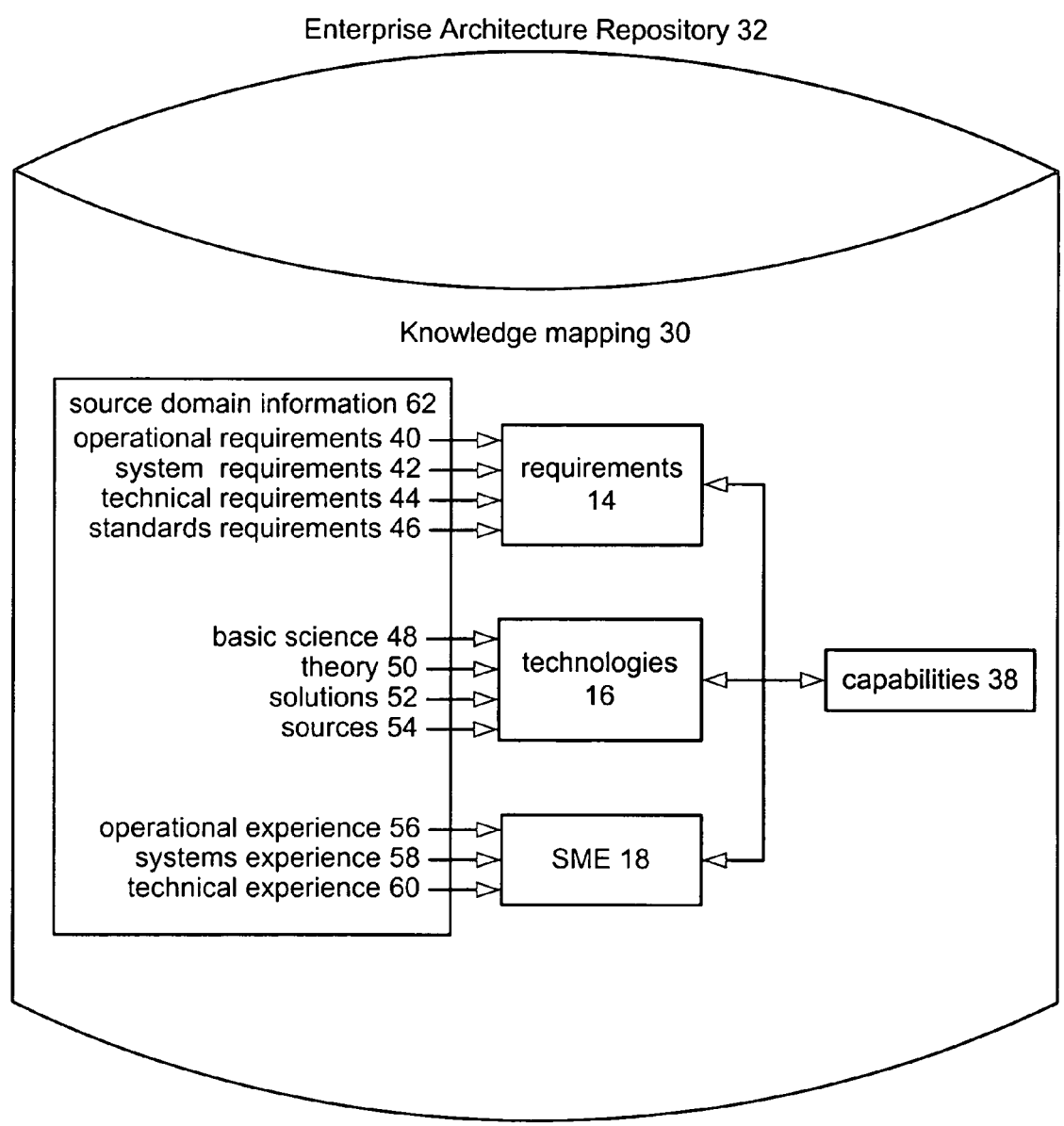
FIG. 2 provides an overview of knowledge mapping within enterprise architecture repository system in accordance with the present invention.

FIG. 2 provides an overview of knowledge mapping 30 within enterprise architecture repository system 32. One problem associated with the prior art and addressed in the present invention is that clients, such as government agencies are shifting their focus from procuring systems to procuring capabilities 38. Identifying capabilities facilitates the recognition of associated shortfalls, needs and development plans. Capabilities 38 provide a unifying concept with which to relate concepts of requirements 14, technologies 16 and inputs of SMEs 18. By examining required capabilities, requirements and technologies are identified and refined with the assistance of SMEs 18. Further, the required capabilities may also be refined with the assistance of SMEs 18. The identified requirements and technologies are then used to identify pertinent inputs with which to populate the repository.

FIG. 2 demonstrates how requirements 14, technologies 16 and inputs of SMEs 18 map to potential capabilities 38. Requirements 14 may include operational 40, systems 42, technical 44, standards 46, or other like requirements known to those skilled in the art. Similarly the technologies 16 may include basic science 48, theory 50, solutions 52, technology sources 54, or other like input into technologies 16. Finally, SMEs 18 derive their expertise from operational expertise 56, systems expertise 58, technical expertise 60, or other like experience. This information for requirements, 14 technologies, 16 and subject matter expertise 18 may be derived from source domain information 62. FIG. 2 depicts that by mapping to potential capabilities 38, requirements 14 call for capabilities 38 that technologies 16 provide. These capabilities 38 occur at the intersection between requirements 14, which may be issued from the procuring entity, and technologies 16.

SMEs 18 help to further refine the potential capabilities 38 that necessitate requirements 14 and technologies 16. SMEs 18 might be a consultant on a particular technology. SMEs might also provide input into the nuts and bolts of an organization or enterprise and how the organization or enterprise focuses and performs a task.

FIG. 2 shows that the present invention may dynamically and automatically update requirements 14, technologies 16 and the identified SMEs 18 relative to capabilities 38. Thus requirements 14, technologies 16 and SMEs 18 may remain current and refined. If there is a change in capability 38, agents can refine the requirements 14, technologies, 16 and SMEs 18 that support this capability.

Further, information obtained from the customizable search agents may be format neutral (i.e., method and system of this invention can maintain consistency of the underlying reference repository for different problem sets). For example this could mean that for different capabilities, problems, projects, etc. that are solving the different issues, the underlying reference repository may be the same but can be dynamically updated and used for the particular problem set while maintaining consistency at its base level so that other users for different problem sets can still have the same information available. Source domain information 62 represents the vast amount of knowledge that is out there that can be culled for the specific knowledge requirements that one is looking to populate a reference repository 32 with. That knowledge can then be pulled from that source domain information in a set manner according to the algorithm however it may be set and then refined further mapped to a particular capability and the same set of knowledge can be mapped to different capabilities as needed and with specificity.

Figure 3:
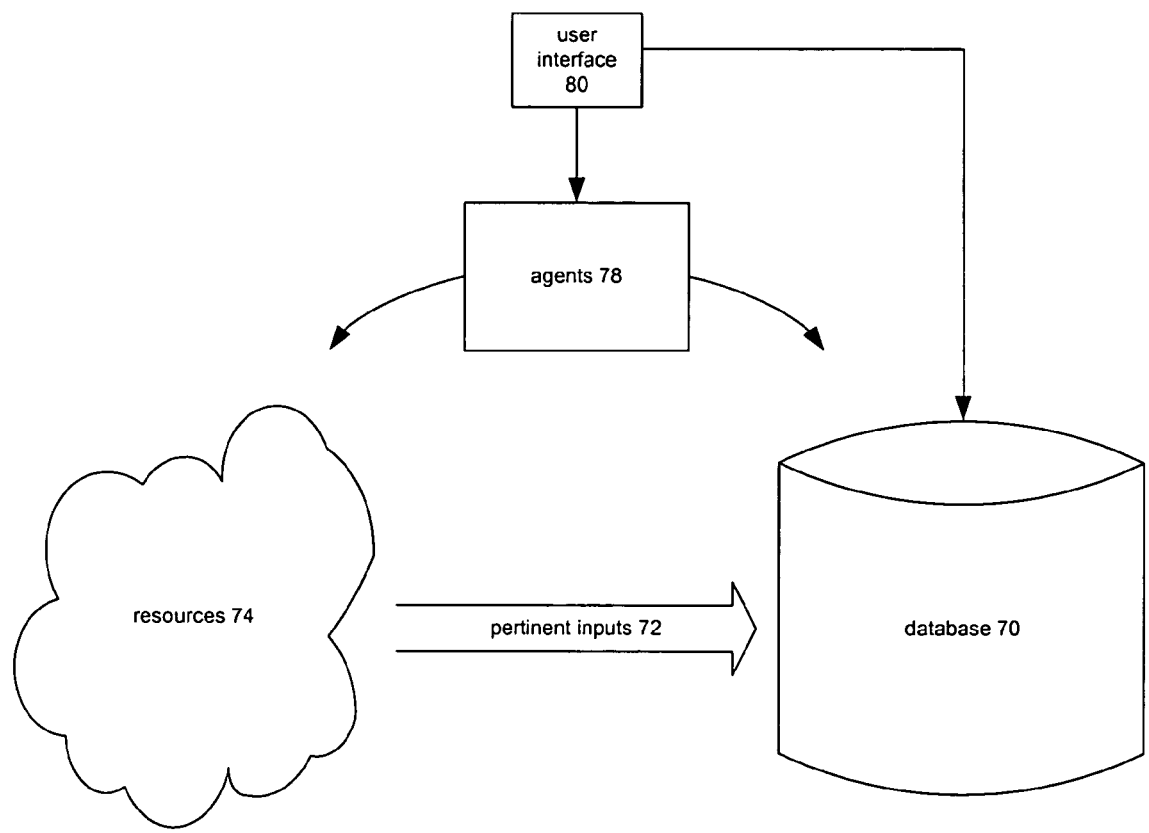
FIG. 3 represents a data base in accordance with the present invention.

FIG. 3 represents a database in accordance with the method and system of this invention and shows how the knowledge is gathered from a large set of knowledge resources culled and refined and then related to the potential capabilities that are the specific capabilities that are required. In particular, FIG. 3 is intended to show that a single interface can be used to provide the entry point into the database, the reference repository from all those knowledge sources. A single interface can be used to access this repository. Once this reference repository is put together, various users at different locations, different large groups widely spaced both in a physical location and different networks can access via the interface into the dynamic reference repository using a common set of import/export tools such as XML or HTML. One of the key points is that this database is dynamic and can have agents to search and retrieve information rather than waiting for people to manually input it as they become aware of it. Automatic searches, ranking and notifications are key features. This is because not all users will be interested in the same thing and in fact each user will probably be interested in only a certain number of those things. A user may not want to be notified of every update of change to the database but in fact only notified of those changes that he or she may be interested in tracking. The method and system of this invention provide that capability. A user for example could provide a list of keywords or key subjects of interest to him or her and could do this upon subscribing to the server such as subscribing to the database, the knowledge base or whatever implementation the invention takes and then when those particular subjects or keywords or changes to those are found the user is updated only on those. The information can then be pushed out to that user. Further, based on, for example past usage by a user or the past habits, search habits, characteristics of a particular user, the method and system of the present invention has the capability to learn from that and tailor or update a search dynamically for that user so as to optimize the results that come back to that user. Even if thus for example additional objects are pushed based on a dynamic re-interpretation or optimizing of a search and the user gets additional information that he or she does not want it can refuse that information and in so doing can provide a sort of feedback mechanism to the algorithm so it learns from its mistakes. As a further example, the method and system of this invention might be able to monitor for example terms reference a key term that is being searched for. For example a search for a particular type of lens, and in the literature of that particularly type of lens may start to be being referred to by a different name by those people in the art or the market space of interest. The method and system of this invention can understand that change in name might not necessarily mean a change in substance and retrieve articles, knowledge, or pieces of information even though they reference the term being referred to by a different name in the literature.

Customizable agents can identify and retrieve pertinent information from domain 62 with specific knowledge requirements with which to populate the enterprise architecture reference repository 32. Customizable agents may be refined manually or automatically to further map to a particular capability 38 and in so doing more efficiently and contextually extract the pertinent information from resources for domain 62. Thus, different customizable agents can contextually map information from domain 62 to different capabilities 38 as needed with specificity in order to properly populate enterprise architecture reference repository 44.

FIG. 3 depicts that database 70 may be thought of as a dynamic reference repository. The present invention maintains this database 70 by discovering pertinent inputs 72 to database 70. These inputs are determined by capabilities 38 and retrieved from requirements 14, technologies 16 and SMEs 18. These pertinent inputs 72 are derived from broad resources 74 which contain library services, automated customized searches, mapping support, ranked search results, continual service updates, SME assessment services, automated notifications to architects and SMEs. However, in this case an intelligent agent can discover and retrieve pertinent inputs 72 from this broad domain of resource 74 and funnel these pertinent inputs into the capability 38. Thus these customizable agents are able to cull a large set of knowledge resources and produce refined and contextual results which appropriately populate database 70 in order to facilitate shared knowledge. A single interface 80 may be used to access database 70 and customizable agents 78. This interface may allow a user to create, edit, and manage customizable search agents 78 in order to properly create, populate, and maintain contextual information extracted from resources 74 in order to provide shared knowledge throughout the enterprise.

One of the key features provided with this architecture is the fact that database 70 is dynamic and may have multiple agents 78 that contextually search, identify, and retrieve pertinent information 72 from resources 74. These customizable search agents track and retrieve this pertinent information rather than waiting for users to manually update database 70.

Figure 4:
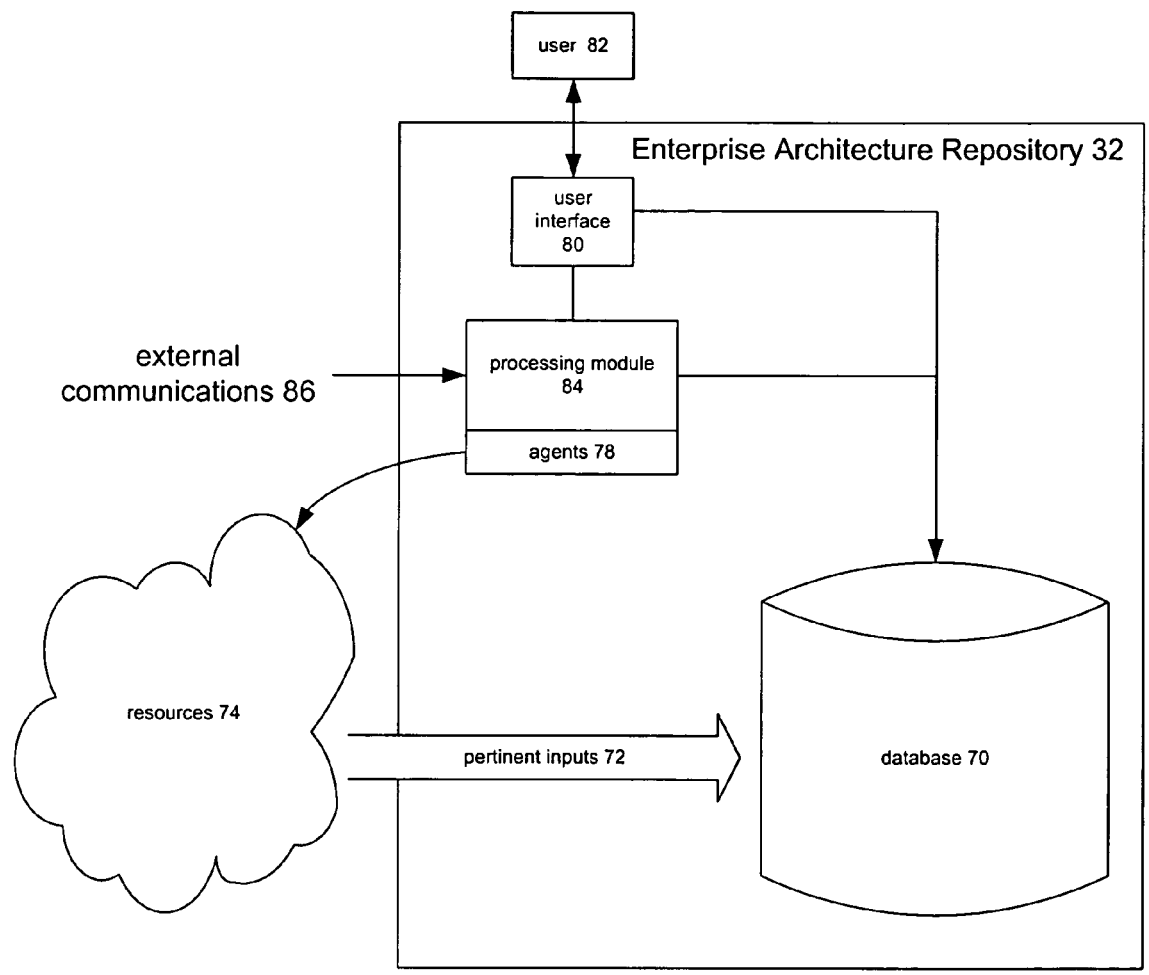
FIG. 4 provides a conceptual block diagram of one embodiment in accordance with the present invention.

FIG. 4 provides a conceptual block diagram of one embodiment of the present invention. Here database 70 interfaces with users 82 via user interface 80. Processing module 84 is operably coupled to database 70 and executes a set of software instructions, agents 78 that identify pertinent inputs 72 to the enterprise architecture repository 32 within resource 74.

Processing module 84 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions stored in memory. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 84 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory stores, and the processing module 84 executes, operational instructions corresponding to at least some of the steps and/or functions illustrated in FIG. 5.

Resources 74 may be an internal network such as the Internet, an external resource such as the Internet, or a portal through which external communications 86 are received. Processing module 84 is further able to manage and distribute the pertinent inputs identified within resources 74 to properly populate and update database 70 within the enterprise architecture repository 32. These processes may further include the cataloguing and maintenance of pertinent inputs identified within resources 74.

Figure 5:
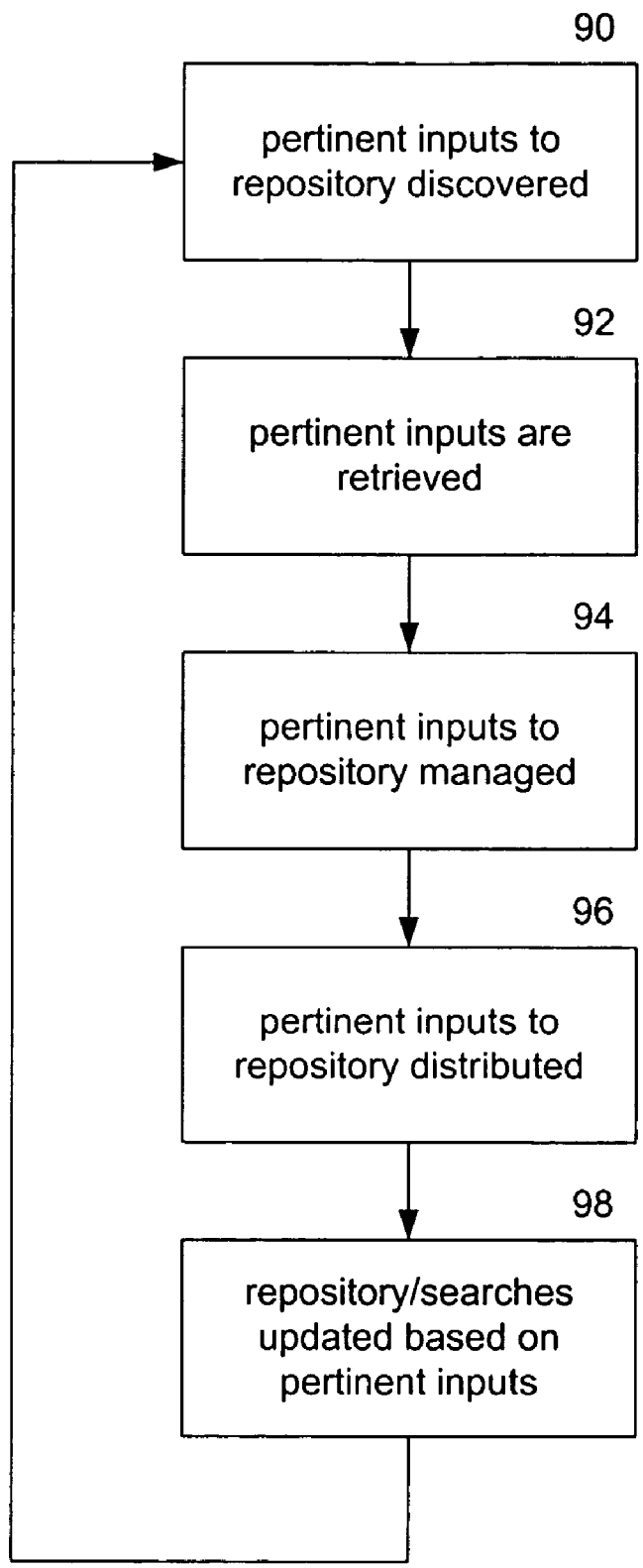
FIG. 5 provides a logic diagram depicting the flow associated with creating and/or maintaining a dynamic reference repository such as enterprise architecture repository in accordance with the present invention.

FIG. 5 provides a logic diagram depicting the flow associated with creating and/or maintaining a dynamic reference repository such as enterprise architecture repository 32. In Step 90, pertinent inputs to dynamic reference repository are discovered and then retrieved in Step 92. These pertinent inputs are then managed and distributed to update the dynamic reference repository in Steps 94 and 96 respectively. The repository, and potentially the search agents, is then updated based on the pertinent inputs in step 98. Additional embodiments may include the cataloguing and maintenance of these pertinent inputs to maintain data currency for the dynamic reference repository.

The process may be repeated as indicated by the process returning to step 90 to discover new or additional pertinent inputs. Additionally, this search agent may perform automated or manually prompted searches to discover and retrieve the pertinent inputs from resources operably coupled to dynamic reference repository. These resources may include the Internet, local networks such as Internet, input from subject matter experts to include assessments, interviews, reviews, or other communications that are addressed directly to the dynamic reference repository such as emails, faxes, voice or other communications as known to those skilled in the art. These customizable agent searches may be developed using a user interface with dynamic reference repository. This user interface allows the user to develop, customize and inter-manage the customizable agent in order to create, update, and maintain the currency and consistency of the dynamic reference repository. Further, the customizable agents may search automatically based on a specified periodicity, search initiation criteria or when manually directed. These searches may be prioritized to specific reference materials.

Although the present invention is described in detail, it should be understood that various changes, substitutions and alterations can be made hereto without departing from the spirit and scope of the invention as described by the appended claims.

What is claimed is:

1. A method for maintaining a dynamic reference repository for an enterprise, comprising the steps of:
performing by a processing module, an automated identification of a plurality of enterprise requirements and a plurality of pertinent enterprise techologies based on a plurality of desired enterprise capabilities to identify and populate the dynamic reference repository with a plurality of pertinent inputs required to support the plurality of desired enterprise capabilities;
discovering the pertinent inputs to the dynamic reference repository, the pertinent inputs including updates to a plurality of existing different information resources previously employed to populate the dynamic reference repository, the plurality of existing different information resources containing knowledge accessible to update or add to the collective knowledge stored within the dynamic reference repository;
retrieving the pertinent inputs to the dynamic reference repository to update or add to the collective knowledge stored in the dynamic reference repository;
contextually mapping the pertinent inputs to the dynamic reference repository;
distributing the pertinent inputs to update the dynamic reference repository;
dynamically updating identified enterprise requirements received from a procuring entity responsive to receiving updates to one or more of the following: operational requirements, system requirements, technical requirements, and standards requirements;

dynamically updating identified enterprise technologies responsive to receiving updates to one or more of the following: basic science, technological theory, technological solutions, and technological sources;

dynamically updating identified enterprise subject matter expert expertise for the enterprise responsive to receiving updates to one or more of the following: enterprise subject matter expert operational experience, systems experience, and technical experience; and dynamically updating a knowledge map between enterprise requirements, enterprise technology, subject matter expertise, and enterprise capabilities responsive to the updated identified enterprise requirements, the updated identified enterprise technologies, and the updated identified enterprise subject matter expert expertise;

at least the discovering, retrieving, and mapping performed with an automated software agent configured to communicate with the plurality of information resources and a dynamic reference repository database for storing collective knowledge, the automated software agent stored in a memory device accessible to the processing module.

2. The method of claim 1, wherein the step of discovering pertinent inputs includes determining the pertinent inputs in a context of a desired capability;

wherein the automated software agent is customizable by a user to define a customizable software agent; and wherein the method further comprises the customizable software agent:

mapping an enterprise technical requirement received from a procuring entity and a plurality of pertinent technologies providing different technical solutions to a desired capability to allow users to evaluate the plurality of different technical solutions to the received enterprise technical requirement;

searching a plurality of information resources to discover the pertinent inputs to the dynamic reference repository, cataloging the pertinent inputs to the dynamic reference repository, and maintaining the pertinent inputs to the dynamic reference repository.

3. The method of claim 1, wherein the step of discovering pertinent inputs to the dynamic reference repository includes identifying updates made to the plurality of information resources previously employed to populate the dynamic reference repository;

wherein the step of distributing the pertinent inputs includes updating the database within the dynamic reference repository; and wherein the method further comprises: providing automated notice of the identified updates made to the existing information resources to each of a plurality of users of the dynamic reference repository, and analyzing and drawing logical linkages between stored repository documents, capability assessments directed to the enterprise, and enterprise subject matter expert expertise.

4. The method of claim 2, wherein the customizable agent searches, discovers, and retrieves the pertinent inputs from Internet and intranet resources;

wherein the customizable agent searches, discovers, and retrieves the pertinent inputs from subject matter experts (SMEs) for the enterprise; and wherein the customizable agent further comprises at least one utility configured to initiate contact with a SME with an online communication and to conduct a SME review or assessment of an enterprise technology or an enterprise capability, the online communication including a link to an interactive enterprise website associated with the dynamic reference repository to conduct the SME review or assessment.

5. The method of claim 1, wherein pertinent inputs are contained in, and retrieved by the automated software agent from communications addressed to the dynamic reference repository for storage within the dynamic reference repository;

wherein the communications addressed to the dynamic reference repository include e-mails containing a subject matter expert assessment of the desired enterprise capability to identify and refine one or more procurement entity provided requirements or enterprise technology addressed to the dynamic reference repository; and wherein the automated software agent includes a utility to perform the step of generating a subject matter expert inputs request for information required to produce the determined pertinent inputs to obtain the required pertinent inputs required to satisfy the desired capability.

6. The method of claim 2, wherein the customizable agent searches are developed using a graphical user interface (GUI) that interfaces with the dynamic reference repository;

wherein the GUI allows a particular user to develop, customize, and manage the customizable agent searches; and wherein the method further comprises:

the customizable agent dynamically modifying a custom user search request prior to execution of the custom user search request to define a current dynamic agent search responsive to one or more of the following: past agent usage by the particular user and current search habits of the particular user, to optimize returned search results, the search results including additional information not desired by the particular user to define undesired information, and providing automated feedback to the customizable agent responsive to a user refusing the undesired information returned during the current dynamic agent search to update a next dynamic agent search.

7. A method for maintaining a dynamic reference repository for an enterprise, comprising the steps of:

performing by a processing module, an automated identification of a plurality of enterprise requirements and a plurality of pertinent enterprise technologies based on a plurality of desired enterprise capabilities to identify and populate the dynamic reference repository with a plurality of pertinent inputs required to support the plurality of desired enterprise capabilities;

discovering the pertinent inputs to the dynamic reference repository, the pertinent inputs including updates to a plurality of existing different information resources previously employed to populate the dynamic reference repository, the plurality of existing different information resources containing knowledge accessible to update or add to the collective knowledge stored within the dynamic reference repository;

retrieving the pertinent inputs to the dynamic reference repository to update or add to the collective knowledge stored in the dynamic reference repository;

contextually mapping the pertinent inputs to the dynamic reference repository;

dynamically updating a knowledge map between enterprise requirements, enterprise technology, and enterprise capabilities responsive to updated identified enterprise requirements and undated identified enterprise technologies;

performing an automated recognition of a global replacement of a first name of a data item in one of the plurality of information resources used during an earlier first time period with that of a second name of the data item used during a later second time period responsive to contextual usage of the second name in the one of the plurality of information resources during the later second time period;

redefining the first name of the data item to that of the second name responsive to the automated recognition of the global replacement of the first name of the data item in the respective information resource, to retrieve pertinent articles, knowledge, or pieces of information defining a plurality of information resource items containing the data item previously referred to by the first name in the respective information resource; and retrieving the plurality of information resource items responsive to a keyword search entry including the first name as a keyword and not the second name as a keyword, at least one information resource item of the plurality of returned information resource items including the data item identified by the second name and not the first name in the respective information resource item;

at least the discovering, retrieving, mapping, and automated recognition performed with an automated software agent configured to communicate with the plurality of information resources and a dynamic reference repository database for storing collective knowledge, the automated software agent stored in a memory device accessible to the processing module.

8. The method of claim 1, wherein the step of discovering the pertinent inputs further comprises running periodic prioritized customizable agent searches prioritized to specific reference materials; and wherein the step of discovering the pertinent inputs further comprises automated time stamping of the discovered pertinent inputs with current time prior to dissemination of notice of the discovered pertinent inputs to users of the database.

9. The method of claim 8, wherein the customizable agent searches are neutral to document format;

wherein the pertinent inputs further comprise documents required to satisfy the desired capability from the plurality of information resources and in a plurality of different document formats, the plurality of different document formats comprising electronic forms that further comprise MS Office, web document, and e-mail document compatible forms;

wherein the customizable agent identifies the documents required to satisfy the desired capability for retrieval;

wherein the customizable agent integrates the retrieved documents having the plurality of different document formats into a common standard format used within an enterprise architecture system, the integration performed prior to storage in the dynamic reference repository; and storing the retrieved documents in the common standard format.

10. The method of claim 1, wherein the step of contextually mapping the pertinent inputs to the dynamic reference repository, includes the step of contextually relating use of a same term within each associated different information resource containing the same term to allow the term to be differentiated and properly used;

wherein the same term comprises an acronym for a first word phrase in one of the at least two different information resources and an acronym for a second word phrase in another one of the at least two different information resources, the second word phrase being unrelated to the first word phrase; and wherein the method further comprises the step of interpreting the meaning of the same term differently for each of the at least two different information resources to differentiate each meaning of the term relative to the respective information resource to prevent returning non-pertinent inputs to a search query including the term.

11. The method of claim 1, further comprising the steps of:

the automated software agent performing an automated recognition of a global replacement of a name of a data item in one of the plurality of information resources from a first name during an earlier first time period to a second name during a later second time period responsive to contextual usage of the second name in the one of the plurality of information resources during the second time period; and retrieving a set of same articles, knowledge, or pieces of information responsive to a plurality of searches by the automated software agent, each based on a separate one of a corresponding plurality of different keyword names referring to a same data item.

12. A dynamic reference repository system for maintaining a dynamic reference repository for an enterprise, the system comprising:

at least one database;

a plurality of different information resources operably coupled to the dynamic reference repository; and a processing module operably coupled to the at least one database and operable to execute a set of instructions that when executed cause the processing module to perform the following operations:

identifying enterprise requirements and enterprise technologies based on a desired enterprise capability to identify and populate the dynamic reference repository with pertinent inputs required to support the desired enterprise capability, identifying the pertinent inputs to the dynamic reference repository within the plurality of different information resources, the pertinent inputs comprising data from the plurality of different information resources containing knowledge accessible to update or add to collective knowledge stored within the dynamic reference repository, retrieving the pertinent inputs to the dynamic reference repository from the plurality of information resources to update or add to the collective knowledge stored in the dynamic reference repository, contextually mapping the pertinent inputs required to support the desired enterprise capability, from the plurality of different information resources to the dynamic reference repository, managing the pertinent inputs to the dynamic reference repository to include:

dynamically updating identified enterprise requirements received from a procuring entity responsive to receiving updates to one or more of the following: operational requirements, system requirements, technical requirements, and standards requirements, dynamically updating identified enterprise technologies responsive to receiving updates to one or more of the following: basic science, technological theory, technological solutions, and technological sources, dynamically updating identified enterprise subject matter expert expertise for the enterprise responsive to receiving updates to one or more of the following: enterprise subject matter expert operational experience, systems experience, and technical experience, dynamically updating a knowledge map between procurement entity provided enterprise requirements provided by a procurement entity, enterprise technology, subject matter expert expertise, and the desired enterprise capability responsive to one or more of the following: updated identified enterprise requirements, updated identified enterprise technologies, and updated identified enterprise subject matter expert expertise, and distributing the pertinent inputs to update the dynamic reference repository.

13. The dynamic reference repository system of claim 12, wherein the operation of identifying the pertinent inputs to the dynamic reference repository includes determining the pertinent inputs in a context of the specified desired capability;

wherein the operation of dynamically updating a knowledge map includes:

cataloging the pertinent inputs to the dynamic reference repository, and mapping an enterprise technical requirement received from a procuring entity and a plurality of pertinent technologies providing different technical solutions to the desired capability to allow users to evaluate the plurality of different technical solutions to the received enterprise technical requirement; and wherein the system further comprises at least one customizable agent configured to search and retrieve the pertinent inputs to the dynamic reference repository from the plurality of information resources and to contextually map the pertinent inputs to the dynamic reference repository to the desired capability.

14. The dynamic reference repository system of claim 12, wherein the pertinent inputs to the dynamic reference repository include updates made to the plurality of information resources utilized by the processing module as a plurality of prior existing sources of information for the dynamic reference repository.

15. The dynamic reference repository system of claim 12, wherein the operation of identifying the pertinent inputs to the dynamic reference repository includes identifying updates made to the plurality of information resources being previously employed by the processing module to populate the dynamic reference repository to define a plurality of existing information resources;

wherein the operation of distributing the pertinent inputs includes updating the database within the dynamic reference repository; and wherein the processing module is further operable to perform the operations of providing automated notice of the identified updates made to the plurality of existing information resources to each of a plurality of users of the dynamic reference repository, and analyzing and drawing logical linkages between updated repository documents, capability assessments directed to the enterprise, and enterprise subject matter expert expertise.

16. The dynamic reference repository system of claim 12, wherein the plurality of information resources comprise one or more of the following: Internet, intranet, and subject matter experts (SMEs) resources;

wherein the processing module is further operable to perform the operations of:

discovering the pertinent inputs by executing a periodic prioritized search of reference materials within the plurality of information resources prioritized to specific user-selected reference materials, and time stamping the pertinent inputs with current time prior to dissemination of notice to users of the at least one database.

17. The dynamic reference repository system of claim 12, further comprising:

at least one customizable agent configured to search and retrieve the pertinent inputs to the dynamic reference repository from the plurality of information resources, the at least one customizable agent comprising at least one utility configured to initiate contact with a subject matter expert (SME) with an online communication and to conduct an interactive SME review or assessment of a procurement entity provided enterprise requirement, an enterprise technology or the desired enterprise capability, the online communication including a link to an interactive enterprise website associated with the dynamic reference repository to conduct the SME review or assessment; and an interface configured to provide a single common user entry point into the at least one database for a plurality of physically spaced apart users connected through a corresponding plurality of different networks, and configured to allow each of the plurality of users to create, edit, and manage the at least one customizable agent to create, populate, and maintain contextual information extracted from the plurality of information resources to provide shared knowledge throughout an enterprise.

18. The dynamic reference repository system of claim 17, wherein the at least one customizable agent is configured to:

dynamically modify a custom user search request prior to execution of the custom user search request to define a current dynamic agent search responsive to one or more of the following: past agent usage by a particular user and current search habits of the particular user to optimize returned search results, the search results including additional information not desired by the particular user to define undesired information, and dynamically perform an automated updating of a next customizable agent search for the particular user responsive to user input refusing the undesired information returned during a current customizable agent search; and wherein the interface to the at least one database is configured to receive pertinent inputs contained within communications addressed to the dynamic reference repository, and to retrieve the received pertinent inputs to the dynamic reference repository for storage in the dynamic reference repository.

19. The dynamic reference repository system of claim 18, wherein the communications addressed to the dynamic reference repository are e-mails containing subject matter expert assessments of a procurement entity provided enterprise requirement, enterprise technology, or enterprise capability addressed to the dynamic reference repository; and
wherein the at least one customizable agent includes a utility to generate a subject matter expert input request for information required to produce the determined pertinent inputs to obtain the required pertinent inputs required to satisfy the desired capability.

20. The dynamic reference repository system of claim 18, wherein the at least one customizable agent comprises utilities to:
recognize a global replacement of a first name of a data item in the plurality of information resources responsive to contextual usage of the first name in the plurality of information resources to retrieve pertinent articles, knowledge, or pieces of information containing the data item referred to by a different name in the plurality of information resources; and
redefine the first name of the data item to that of the second name responsive to the recognition of the global replacement of the first name of the data item in the plurality of information resources to retrieve pertinent articles, knowledge, or pieces of information containing the data item previously referred to by the first name in the plurality of information resources.

21. The dynamic reference repository system of claim 17, wherein the at least one customizable agent is neutral to document format;
wherein the pertinent inputs further comprise documents required to satisfy the desired capability from the plurality of information resources and in a plurality of different document formats, the plurality of different document formats comprising electronic forms that further comprise MS Office, web document, and e-mail document compatible forms;
wherein the at least one customizable agent is configured to identify the documents required to satisfy the desired capability for retrieval; and
wherein the at least one customizable agent is configured to integrate the retrieved documents having the plurality of different document formats into a common standard format used within an enterprise architecture system including the dynamic reference repository system; and
storing the retrieved documents in the common standard format.

22. The dynamic reference repository system of claim 12, wherein the operation of contextually mapping the pertinent inputs to the dynamic reference repository includes the operation of contextually relating use of a same term within each associated different information resource containing the same term to allow the term to be differentiated and properly used; and
wherein the processing module is further operable to perform the operation of interpreting the meaning of the same term differently for the at least two different information resources to differentiate each disparate meaning of the term relative to the respective associated different information resource to prevent returning non-pertinent inputs to a search query including the term.

23. The dynamic reference repository system of claim 12, further comprising at least one customizable software agent configured to:
recognize a global replacement of a name of a data item in one of the plurality of information resources from a first name during an earlier first time period to a second name during a later second time period responsive to contextual usage of the second name in the one of the plurality of information resources during the second time period; and
retrieve a second set of articles, knowledge, or pieces of information defining a second set of returned pertinent inputs returned from the one of the plurality of information resources responsive to a second keyword search by the at least one customizable software agent performed during the second time period, the second set of returned pertinent inputs related to a similar first set of previously retrieved pertinent inputs retrieved responsive to a first keyword search performed during the first time period, the first keyword search and the second keyword search both including the first name as a keyword and not the second name as a keyword, at least one of the second set of returned pertinent inputs including the second name used to refer to the data item and not the first name to refer to the data item.

24. A method for populating a dynamic reference repository for an enterprise, comprising:
performing by a processing module, an automated identification of enterprise requirements and pertinent enterprise technologies based on a desired enterprise capability to identify and populate the dynamic reference repository with pertinent inputs required to support the desired enterprise capability;
discovering pertinent inputs to the dynamic reference repository, the pertinent inputs comprising data from a plurality of information resources containing knowledge accessible to update or add to the collective knowledge stored within the dynamic reference repository;
retrieving the pertinent inputs to the dynamic reference repository, wherein an automated customizable software agent searches for, discovers, and retrieves the pertinent inputs to the dynamic reference repository from Internet or intranet accessible resources;
managing the pertinent inputs to the dynamic reference repository to update or add to the collective knowledge stored in the dynamic reference repository;
distributing the pertinent inputs to populate the dynamic reference repository; and
at least the discovering, retrieving, managing, and distributing performed by the automated customizable software agent configured to communicate with the plurality of information resources and the stored knowledge in the dynamic reference repository, the customizable software agent stored in a memory device accessible to the processing module and including at least one utility configured to initiate contact with a SME with an online communication and to conduct a subject matter expert (SME) review or assessment of an enterprise technology or the desired enterprise capability, the online communication including a link to an interactive enterprise website associated with the dynamic reference repository to conduct the SME review or assessment.

25. The method of claim 24, further comprising the steps of:
conducting the SME review or assessment of the enterprise technology or the desired enterprise capability through the interactive enterprise website; and refining the desired enterprise capability responsive to the SME review or assessment.

26. The method of claim 24,
wherein the step of managing the pertinent inputs to the dynamic reference repository includes the steps of:
contextually relating use of a term within each of a first and a second one of the plurality of information resources containing the term to allow the term to be differentiated and properly used, and
differentiating a first meaning behind the term with respect to an associated first one of the plurality of information resources and a second meaning behind the term with respect to a second one of the plurality of information resources unrelated to the first meaning, to prevent returning non-pertinent inputs to a search query including the term;
wherein the first one of the plurality of information resources is a first electronic communication addressed to the dynamic reference repository;
wherein the second one of the plurality of information resources is a second electronic communication addressed to the dynamic reference repository;
wherein the first and the second meanings are disparate first and second meanings;
wherein the term is an acronym used as a keyword matching a first abbreviation of a word or phrase used within the first electronic communication according to the first meaning and matching a second abbreviation of a different word or phrase used in the second electronic communication according to the second meaning;
wherein the pertinent inputs are contained in and retrieved by the customizable software agent from the first and the second electronic communications addressed to the dynamic reference repository;
wherein the step of contextually relating use of a term within each of a first and a second one of the plurality of information resources containing the term includes:
tagging the acronym and contextually relating the acronym separately with each of the separate associated first and second electronic communications to allow the acronym to be differentiated and properly used to maintain integrity of each assigned meaning of the acronym; and
wherein the method further comprises interpreting the meaning of the acronym differently for the first and the second electronic communications to differentiate each meaning of the acronym relative to the respective electronic communication to prevent returning non-pertinent inputs to a search query directed to data associated with only one of the disparate meanings.

27. The method of claim 1,
wherein the step of discovering pertinent inputs includes iteratively performing an automated search for updates made to the plurality of existing information resources for the dynamic reference repository and identification of such updates when existing responsive to a preset interval;
wherein the step of distributing the pertinent inputs includes updating the database within the dynamic reference repository responsive to the automated identification of the updates; and
wherein the method further comprises the step of automatically disseminating a plurality of user tailored notices of the identified updates to a corresponding plurality of users of the dynamic reference repository responsive to the automated identification of the updates, each user tailored notice individually tailored for each separate one of the plurality of users responsive to a list of keywords provided by the respective user and different from that of each other of the plurality of users to provide selective individual user-based notification.

28. The method of claim 1, further comprising the steps of:
dynamically modifying a current search for a user searching the dynamic reference repository prior to execution of the current search responsive to search habits of the user to optimize search results for the user, the search results of the current search including additional information not desired by the particular user to define undesired information; and
dynamically updating a next search responsive to user input rejecting the undesired information gathered during the current search to optimize search results for the user.

29. The dynamic reference repository system of claim 12,
wherein the processing module is further operable to:
tag a term and contextually relate the term with its associated information resource to allow the term to be differentiated and properly used to maintain integrity of an assigned meaning of the term, and
differentiate a first meaning behind the term with respect to a first associated information resource and a second meaning behind the term with respect to a second information resource to prevent returning non-pertinent inputs to a search query including the term; and
wherein the processing module is further operable to:
redefine contextually a definition of the term underlying the at least one database responsive to one or more identified pertinent inputs identifying a change in a usage of the term.

30. The dynamic reference repository system of claim 12,
wherein the instructions to identify pertinent inputs to the dynamic reference repository include those to perform an automated identification of updates made to the plurality of information resources being previously employed by the processing module to populate the dynamic reference repository to define a plurality of existing information resources for the dynamic reference repository and identification of such updates when existing responsive to a preset interval;
wherein instructions to distribute the pertinent inputs includes those to update the at least one database within the dynamic reference repository responsive to the automated identification of the updates; and
wherein the processing module is further operable to automatically disseminate a plurality of user tailored notices of the identified updates to a corresponding plurality of users of the dynamic reference repository responsive to the automated identification of the updates, each user tailored notice individually tailored for each separate one of the plurality of users responsive to a list of keywords provided by the respective user and different from that of each other of the plurality of users to provide selective individual user-based notification to enhance prevention of notification of updates of no interest to the respective user.

31. The dynamic reference repository system of claim 12,
wherein the processing module is further operable to:
dynamically modify a current search for a user searching the dynamic reference repository prior to execution of the current search responsive to search habits of the user to optimize returned search results for the user, the search results of the current search including additional information not desired by the particular user to define undesired information; and dynamic update a next search responsive to user input rejecting the undesired information gathered during the current search to optimize search results for the user.

32. A dynamic reference repository system for maintaining a dynamic reference repository for an enterprise, the system comprising:

at least one database;

a plurality of different information resources operably coupled to the dynamic reference repository; and a processing module operably coupled to the at least one database and operable to execute a set of instructions that when executed cause the processing module to perform the following operations:

identifying enterprise requirements and pertinent enterprise technologies based on a desired enterprise capability to identify and populate the dynamic reference repository with pertinent inputs required to support the desired enterprise capability, identifying the pertinent inputs to the dynamic reference repository within the plurality of different information resources, the pertinent inputs comprising data from the plurality of different information resources containing knowledge accessible to update or add to collective knowledge stored within the dynamic reference repository, retrieving the pertinent inputs to the dynamic reference repository from the plurality of information resources to update or add to the collective knowledge stored in the dynamic reference repository, contextually mapping the pertinent inputs required to support the desired enterprise capability, from the plurality of different information resources to the dynamic reference repository, managing the pertinent inputs to the dynamic reference repository to include:

dynamically updating a knowledge map between procurement entity provided enterprise requirements provided by a procurement entity, enterprise technology, subject matter expert expertise, and the desired enterprise capability responsive to one or more of the following: updated identified enterprise requirements, updated identified enterprise technologies, and updated identified enterprise subject matter expert expertise, and distributing the pertinent inputs to update the dynamic reference repository; and at least one customizable agent configured to search and retrieve the pertinent inputs to the dynamic reference repository from the plurality of information resources, the at least one customizable agent comprising at least one utility configured to initiate contact with a subject matter expert (SME) with an online communication and to conduct an interactive SME review or assessment of a procurement entity provided enterprise requirement, an enterprise technology or the desired enterprise capability, the online communication including a link to an interactive enterprise website associated with the dynamic reference repository to conduct the SME review or assessment.

33. The dynamic reference repository system of claim 32, wherein the operation of identifying pertinent inputs to the dynamic reference repository includes determining the pertinent inputs in a context of the specified desired capability;

wherein the operation of dynamically updating a knowledge map includes:

cataloging the pertinent inputs to the dynamic reference repository, and mapping an enterprise technical requirement received from a procuring entity and a plurality of pertinent technologies providing different technical solutions to the desired capability to allow users to evaluate the plurality of different technical solutions to the received enterprise technical requirement; and wherein the at least one customizable agent is further configured to contextually map the pertinent inputs to the dynamic reference repository to the desired capability.

34. The dynamic reference repository system of claim 32, wherein the pertinent inputs to the dynamic reference repository include updates made to the plurality of information resources utilized by the processing module as a plurality of prior existing sources of information for the dynamic reference repository, and wherein the processing module is further operable to perform the following operations:

dynamically updating identified enterprise requirements provided by a procuring entity responsive to receiving updates to one or more of the following: operational requirements, system requirements, technical requirements, and standards requirements;

dynamically updating identified enterprise technologies responsive to receiving updates to one or more of the following: basic science, technological theory, technological solutions, and technological sources; and dynamically updating identified enterprise subject matter expert expertise for the enterprise responsive to receiving updates to one or more of the following: enterprise subject matter expert operational experience, systems experience, and technical experience.

35. The dynamic reference repository system of claim 32, wherein the operation of identifying the pertinent inputs to the dynamic reference repository includes identifying updates made to the plurality of information resources being previously employed by the processing module to populate the dynamic reference repository to define a plurality of existing information resources;

wherein the operation of distributing the pertinent inputs includes updating the database within the dynamic reference repository; and wherein the processing module is further operable to perform the operations of providing automated notice of the identified updates made to the plurality of existing information resources to each of a plurality of users of the dynamic reference repository, and analyzing and drawing logical linkages between updated repository documents, capability assessments directed to the enterprise, and enterprise subject matter expert expertise.

36. The dynamic reference repository system of claim 32, wherein the at least one customizable agent is configured to:

dynamically modify a custom user search request prior to execution of the custom user search request to define a current dynamic agent search responsive to one or more of the following: past agent usage by a particular user and current search habits of the particular user to optimize returned search results, the search results including additional information not desired by the particular user to define undesired information, and dynamically perform an automated updating of a next customizable agent search for the particular user responsive to user input refusing the undesired information returned during a current customizable agent search.

37. The dynamic reference repository system of claim 32, wherein the at least one customizable agent comprises utilities to:

recognize a global replacement of a first name of a data item in the plurality of information resources responsive to contextual usage of the first name in the plurality of information resources to retrieve pertinent articles, knowledge, or pieces of information containing the data item referred to by a different name in the plurality of information resources; and redefine the first name of the data item to that of the second name responsive to the recognition of the global replacement of the first name of the data item in the plurality of information resources to retrieve pertinent articles, knowledge, or pieces of information containing the data item previously referred to by the first name in the plurality of information resources.

38. The dynamic reference repository system of claim 32, further comprising at least one customizable software agent configured to:

recognize a global replacement of a name of a data item in one of the plurality of information resources from a first name during an earlier first time period to a second name during a later second time period responsive to contextual usage of the second name in the one of the plurality of information resources during the second time period; and retrieve a second set of articles, knowledge, or pieces of information defining a second set of returned pertinent inputs returned from the one of the plurality of information resources responsive to a second keyword search by the at least one customizable software agent performed during the second time period, the second set of returned pertinent inputs related to a similar first set of previously retrieved pertinent inputs retrieved responsive to a first keyword search performed during the first time period, the first keyword search and the second keyword search both including the first name as a keyword and not the second name as a keyword, at least one of the second set of returned pertinent inputs including the second name used to refer to the data item and not the first name to refer to the data item.

* * * * *